July 29, 1969   L. L. COUNCIL   3,458,055
PORTABLE PIPE-HANDLING APPARATUS
Original Filed Jan. 13, 1966   3 Sheets-Sheet 1
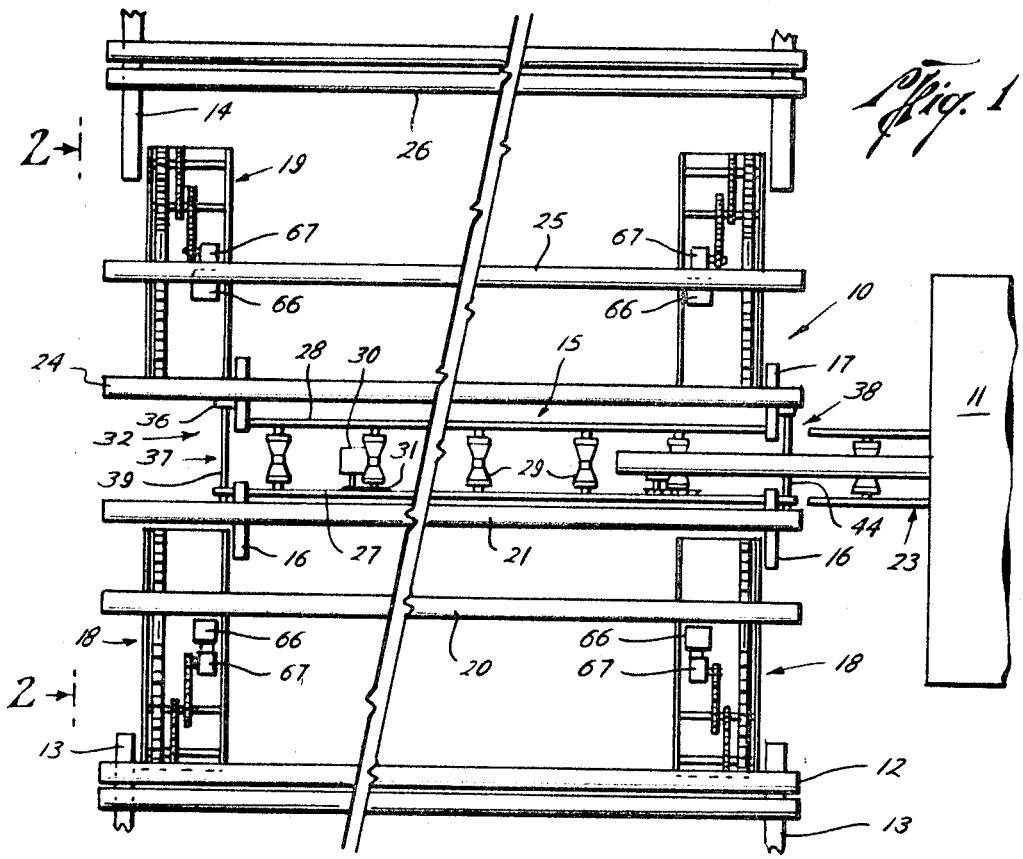
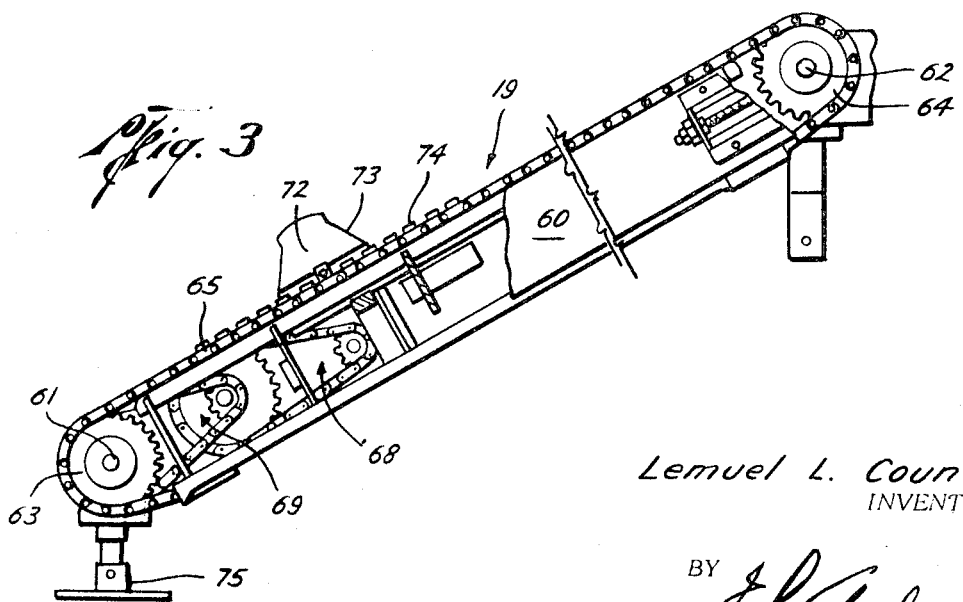
Lemuel L. Council
INVENTOR.
BY
ATTORNEY

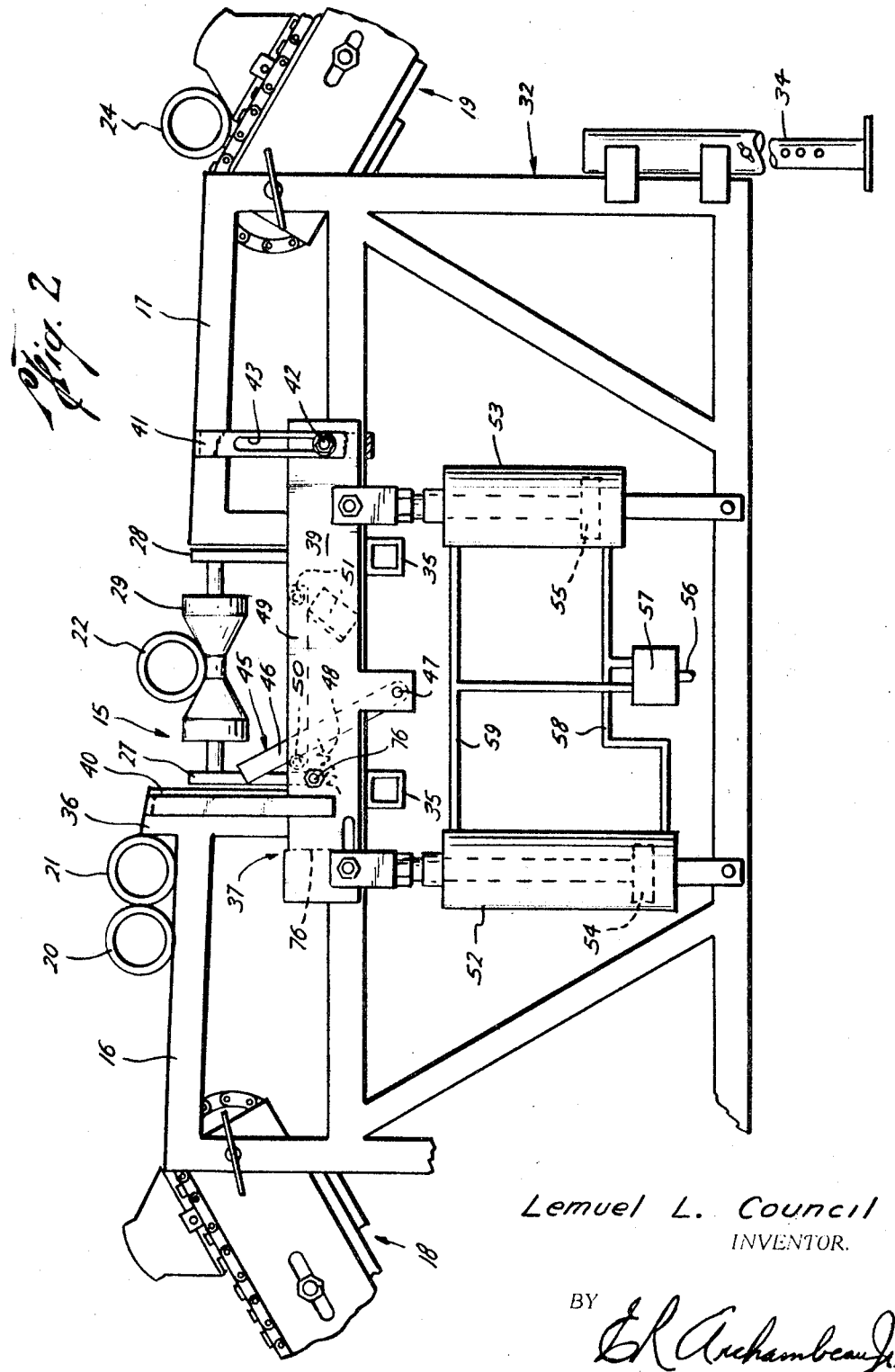

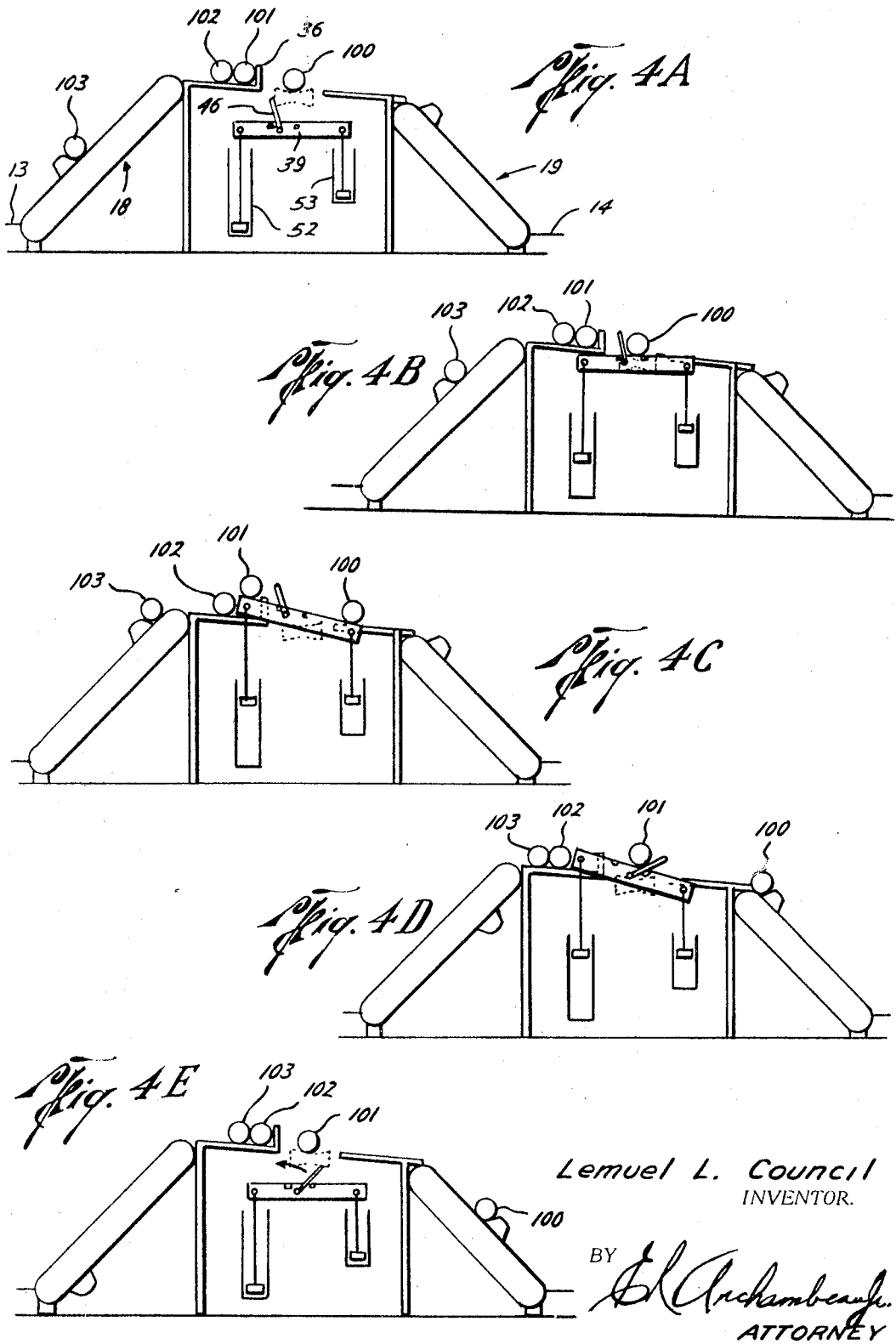

United States Patent Office 3,458,055
Patented July 29, 1969

3,458,055
PORTABLE PIPE-HANDLING APPARATUS
Lemuel L. Council, Houston, Tex., assignor to Schlumberger Technology Corporation, New York, N.Y., a corporation of Texas
Continuation of application Ser. No. 520,443, Jan. 13, 1966, now abandoned. This application May 27, 1968, Ser. No. 732,337
Int. Cl. B25j 3/00
U.S. Cl. 214—1                                    14 Claims

ABSTRACT OF THE DISCLOSURE

The particular embodiment of compactly-arranged and portable pipe-handling apparatus described herein as illustrative of the present invention includes a horizontal conveyor adapted to axially transport joints or sections of pipe to and from a predetermined location and having pipe supports positioned on opposite sides thereof. Pipe-lifting devices are operatively arranged for successively moving a first pipe section from one support onto the conveyor as a second pipe section is being removed therefrom and moved onto the other support. By means of operatively-associated stops, no pipe section can be placed onto the conveyor until any pipe section thereon is removed.

---

This application is a continuation of application Ser. No. 520,443, filed Jan. 13, 1966, now abandoned.

In order to properly conduct typical pipe-inspection operations at remote field locations such as drilling rigs and along pipelines, it is, of course, preferred that the pipe-inspection devices and associated pipe-handling apparatus be transportable by a single vehicle. Thus, to facilitate its conveyance, equipment of this nature must be as compact and lightweight as possible to reduce the size of the transport vehicle without sacrificing efficiency and reliability.

Accordingly, it is an object of the present invention to provide new and improved portable pipe-handling apparatus for efficiently handling long and usually very-heavy pipe sections, with this apparatus being particularly adapted for convenient transportation as well as simple assembly and disassembly. This and other objects of the present invention are attained by arranging first and second pipe supports along each side of a horizontal conveyor adapted to axially translate pipe sections to and from the conveyor. Selectively-operable pipe-transfer means are longitudinally spaced along the conveyor for successively moving pipe sections from the first pipe support onto the conveyor as other pipe sections are removed therefrom and placed onto the second pipe support. To accomplish this with apparatus of a minimum size, selectively-movable transfer arms spanning the gap between the pipe supports are adapted for coordinated vertical movements from below the pipe supports and conveyor to successive elevated positions where a pipe section on the conveyor will be rolled onto the second pipe support as the next pipe is moved onto the conveyor from the first support. By arranging stop members to cooperate with these unique movements of the transfer arms, any pipe section on the conveyor will be transferred onto the second support before the next pipe section is moved onto the conveyor without the dimensions of the pipe-transferring apparatus being excessive.

The novel features of the present invention are set forth with particularity in the appended claims. The operation, together with further objects and advantages thereof, may best be understood by way of illustration and example of a certain embodiment when taken in conjunction with the accompanying drawings, in which:

FIGURE 1 is a plan view of pipe-handling apparatus incorporating the principles of the present invention during the course of a typical operation thereof;

FIGURES 2 and 3 are elevational end views of respective portions of the pipe-handling apparatus shown in FIGURE 1; and FIGURES 4A–4E are schematic views successively illustrating one operational cycle of the apparatus of the present invention.

Turning now to FIGURE 1, a plan view is shown of pipe-handling apparatus 10 of the present invention in readiness for operation. To illustrate a typical situation in which the new and improved apparatus 10 can be advantageously used, the pipe-handling apparatus is shown as being positioned adjacent the rear of a vehicle 11 carrying one or more pipe-inspection devices (such as shown in Patent No. 3,287,632) for inspecting elongated sections of pipe, as at 12, for flaws. As is typical in the oil field and on pipeline-construction sites, heavy joints of pipe as at 12 are horizontally supported on suitable platforms or paralleled timbers, as at 13 and 14, laid on the ground. To inspect these pipes 12, they must, therefore, be successively moved onto the pipe-handling apparatus and, following their inspection, removed therefrom. Accordingly, it is customary to position the pipe-handling apparatus 10 with its longitudinal axis generally parallel to the pipes 12 and between the pipe-supporting platforms 13 and 14, with the test vehicle 11 being immediately adjacent to one end of the pipe-handling apparatus. In this manner, as a flaw-detection operation is conducted, the pipes 12 can be conveniently rolled along the first platform 13 into position to be received by the pipe-handling apparatus 10. As will subsequently be explained, the pipes 12 are then successively received by the apparatus 10, moved into and out of the inspection vehicle 11, and subsequently discharged from the pipe handling apparatus onto the second platform 14. The particular nature of the inspection operation involved here is, of course, irrelevant insofar as understanding the present invention.

The pipe-handling apparatus 10 is basically comprised of a centrally positioned conveyor 15 adapted to support sections of pipe for longitudinal translation along a generally horizontal axis into and out of the inspection vehicle 11. To properly position pipes for regulated movement onto the conveyor 15, a plurality of lateral pipe supports 16 are arranged at spaced intervals along one side of the conveyor for horizontally supporting a limited number of pipe sections of a greater length than the conveyor. Similarly, to receive pipes as they are discharged from the conveyor 15, a plurality of lateral pipe supports 17 are arranged at spaced intervals along the other side of the conveyor for horizontally supporting the pipe sections before they are moved onto the pipe platform 14. Since the pipe platforms are typically at a lower elevation than the efficient working height of the conveyor 15, selectively-operable pipe elevators 18 and 19 are positioned on opposite sides of the conveyor for respectively elevating pipe sections from the pipe platform 13 onto the pipe supports 16 and laterally moving pipe sections from the pipe supports 17 onto the other platform 14.

Accordingly, it will be appreciated from FIGURE 1 that the typical sequence of operation of the pipe-handling apparatus 10 will be to roll a pipe section, as at 12, along the platform 13 into position for reception by the pipe elevators 18. Once a pipe section, as at 20, is on the elevators 18, it will be lifted onto the pipe supports 16 and come to rest alongside other pipe sections, as at 21, that have previously been moved onto the supports. The pipe section 21 is temporarily held on the pipe supports 16 as another pipe section 22 is axially translated into and out of the inspection vehicle 11 on either a longitudinal extension of the conveyor 15 or another conveyor 23 in axial alignment therewith. In either event, once a pipe section is inspected, it is returned to the conveyor 15 and, as shown at 24, selectively moved over onto the pipe supports 17. Pipe sections, as at 25, that have previously been placed onto the supports 17 are received by the pipe elevators 19 and transported to the platform 14 to join other pipe sections, as at 26, that have already been inspected. Thus, during the course of a typical inspection operation, pipe sections will be successively moved by the pipe-handling apparatus 10 from the platform 13 to the platform 14 as required so that at any particular moment, pipe sections may be in any one or more of the locations illustrated in FIGURE 1 as being occupied by the pipe sections 12, 20–22 and 24–26.

As seen in FIGURES 1 and 2, the pipe conveyor 15 is comprised of a spaced pair of horizontal longitudinal rails 27 and 28 carrying pipe-translating means, such as a plurality of transverse or horizontal rollers 29 journalled between the side rails and longitudinally spaced therealong, for controlled movement of pipe sections, as at 22, along a generally horizontal axis into and out of the inspection vehicle 11. To facilitate axial movement of pipe sections as 22 along the longitudinal axis of the conveyor 15, suitable driving motors 30 are preferably coupled by means, such as a chain drive 31, to one or more of the rollers 29 for selectively powering these driven rollers in either rotative direction. Uprights 32 and 33 of sufficient structural strength are respectively arranged at the opposite ends of the side rails 27 and 28 for supporting the conveyor 15 at a convenient elevation above the ground. To allow placement of the apparatus 10 on uneven ground, the uprights 32 and 33 are preferably provided with suitable adjustable or telescoping legs, as at 34, for leveling the pipe-handling apparatus. If desired, longitudinal structural members, as at 35, can be used to interconnect the uprights 32 and 33 so that the conveyor 15 can merely be laid across the uprights once they are erected.

As best seen in FIGURE 2, in the preferred embodiment of the pipe-handling apparatus 10, the lateral pipe supports 16 and 17 are arranged as the uppermost integral transverse members of the uprights 32 and 33. Although one or both of the pipe supports could be generally horizontal, it is preferred, however, that their respective upper surfaces conjunctively define slightly-downward interrupted inclines from the higher supports 16 to the lower supports 17, with the interruptions or transverse gaps therebetween being sufficient to receive the conveyor 15. In this manner, once the pipe elevators 18 deliver a pipe section as at 20 onto the outer ends of the higher inclined supports, the pipe will naturally roll (from left to right as viewed in FIGURE 2) downwardly toward the conveyor 15 until coming to rest against the pipe 21 which has previously been halted along the near side of the conveyor by appropriately-arranged upright stop members 36 projecting upwardly from the uprights 32 and 33. Similarly, once a pipe section, as at 24, is removed from the conveyor 15 and transferred onto the lower inclined supports 17, the pipe will roll downwardly thereacross without assistance and onto the pipe elevators 19 adjacent thereto.

It will be appreciated, however, that pipe sections as at 21 must be lifted over the fixed upright stops 36 to reach the rollers 29. Similarly, pipes as at 22 must be lifted from the conveyor 15 and transferred onto the lower pipe-supports 17 before the next pipe section is laid onto the conveyor. To accomplish these transfers most efficiently, the pipe-handling apparatus 10 is operatively arranged to simultaneously shift one pipe section (as at 22) off of the conveyor 15 as the next-following pipe (as at 21) is being moved onto the conveyor. It will be realized, of course, that by carefully coordinating these transfer sequences, little time will be wasted so that the inspection operations can be continuously conducted with little or no delay.

Accordingly, the pipe-handling apparatus 10 includes similar or identical first and second selectively-operable pipe-transfer means 37 and 38 that are respectively mounted on the uprights 32 and 33 and adapted to operate in unison. As best seen in FIGURE 2, the pipe-transfer means 37, for example, are comprised of a transverse arm 39 operatively mounted on the upright 32 and adapted for vertical movement thereon between a first inactive position below the longitudinal axis of the conveyor 15 and a second, more-elevated, tilted position where the upper face of the arm is bridging the transverse gap between its associated lateral pipe-supports 16 and 17 and defines a downwardly-inclined working surface about even with the upper end of the fixed upright stop 36 to the upper face of the lower pipe-support. To maintain the transfer arm 39 in a generally vertical plane of movement just beyond one end of the conveyor 15, guide means, such as transversely-spaced, somewhat U-shaped brackets 40 and 41 mounted on the upright 32, define elongated, generally-vertical apertures through which the transfer arm can freely slide.

For reasons that will subsequently become more apparent, the right-hand end (as viewed in FIGURE 2) of the transfer arm 39 is slidably and pivotally connected for vertical movement over a limited span of travel below the lower pipe support 17. In the preferred embodiment of the pipe-handling apparatus 10, this plural-movement connection is accomplished by pivotally connecting the right-hand end of the transfer arm 39 to the guide bracket 41 by means of a shaft or pin 42 projecting from the arm and having its distal end slidably received in an elongated, generally vertical guide or slot 43 formed in the guide bracket and defining the aforementioned vertical span of travel. By terminating the upper end of the guide slot 43 at an elevation substantially below that of the upper end of the upright fixed stop 36, upward travel of the transfer arm 39 away from its initial position (as shown in FIGURE 2) will be uniquely effective to first shift the arm to an intermediate position generally just below the longitudinal axis of the conveyor 15; and then, once the pivot pin 42 is at the upper end of its associated slot 43, cause the left-hand or free end of the transfer arm to pivot thereabout until the upper surface thereof is about even with the upper end of the fixed stop 36. As will subsequently be described in relation to other figures of the drawings, this unique motion of the transfer arm 39 in cooperation with the corresponding joint motion of the transfer arm 44 of the other pipe-transfer means 38 will simultaneously bring the transfer arms into contact with the underside of the overhanging ends of a pipe as at 22 lying on the conveyor 15 and then elevate this pipe as the transfer arms move further upwardly. As the transfer arms 39 and 44 continue moving upwardly and begin pivoting about their respective pivots (as at 42), the upper surfaces of the arms will provide a progressively-steeper incline across which the pipe then on the conveyor 15, as at 22, can roll onto the lower pipe supports 17.

Since the free ends of the transfer arms 39 and 44 extend outside of the upright stops 36 and are initially below the overhanging ends of a pipe as at 21 lying across the pipe supports 16, the continued motion of the transfer arms from their first inclined position toward their second or final more-inclined position will also present a progressively steeper incline across which the previously-halted pipe section can roll once it is about even with the upper end of the stops 36. If this rolling of the pipe section 21 were not governed, the pipe would most likely continue rolling on across the conveyor 15 onto the lower pipe supports 17. Accordingly, to halt this rolling pipe section as at 21 once it is over the conveyor 15, the pipe-transfer means 37 and 38 of the present invention also include selectively-movable arresting or stop means as at 45 that are interposed between a pipe section on the conveyor and one that has not yet moved thereon and cooperate to properly position the latter pipe section above the conveyor as the former pipe is removed therefrom. In the preferred embodiment of the present invention illustrated in FIGURE 2, the selectively-operable arresting means 45 are respectively comprised of an upright rigid arm 46 pivotally connected, as at 47, at its lower end to an intermediate portion of the transfer arm 39 and having its free, upper end normally urged by a spring 48 toward the left-hand or free end of the transfer arm. If desired, a horizontal guide or U-shaped bracket 49 on the transfer arm 39 can be arranged to closely confine the pivoting arresting member 46 against the transfer arm. Opposed stops 50 and 51 are properly spaced at opposite ends of the bracket 49 to limit the arcuate movements of the pivoted arm 46.

Accordingly, the pivoting arresting arm 46 (and its companion on the other transfer arm 44) is cooperatively moved upwardly between the pipe sections 21 and 22 as the transfer arms are elevated. Then, once the pipe 21 clears the upright fixed stops 36 and begins to roll downwardly across the transfer arms 39 and 44, the rolling pipe section will carry the pivoting stop members as at 46 over into abutment with their respective fixed stops as at 51 and further movement of the rolling pipe section will, of course, then be arrested. Return of the transfer arms 39 and 44 downwardly toward their initial position (as shown in FIGURE 2) will in time lower the now-halted pipe section 21 onto the rollers 29. Thus, by properly proportioning the length of the pivoted arresting arms as at 46, by the time that the transfer arms 39 and 44 reach their initial position, the free ends of the pivoted arms will have cleared the underside of whatever pipe section is on the rollers 29 and the springs as at 48 will return the pivoted arms to their normal position against their respective fixed stop as at 50.

The above-described unique motions of the transfer arms 39 and 44, of course, require appropriate motive means to first move both ends of the arms upwardly and then begin the pivotal movement of the free ends of the arms in relation to their other ends. In the preferred embodiment of the present invention, the transfer arm 39, for example, is moved upwardly by selectively-operable motive means such as first and second piston actuators 52 and 53 mounted on the upright 32 and respectively having their piston members 54 and 55 operatively coupled to the transfer arm. A source of pressurized fluid, such as a compressor unit (not shown) on the vehicle 11 for example, is adapted for connection, as at 56, to a selectively-operable control valve 57 for selectively admitting pressurized fluid to the piston actuators 52 and 53 by suitable conduits as at 58 and 59.

With two piston actuators arranged as shown in FIGURE 2, it will be appreciated that the piston actuator 52 coupled near the free end of the transfer arm 39 must have a stroke of greater length than that of the piston actuator 53 supporting the pivoted end of the transfer arm to achieve the above-described motions of the transfer arms. Thus, upon application of a pressurized fluid to the conduits 58, the pistons 54 and 55 will rise in unison to move the transfer arm 39 upwardly without significantly changing its inclination. Then, once the sliding pivot pin 42 is at about the upper end of its associated slot 43, the piston 55 will have reached its upper limit and the free end of the transfer arm 39 will now begin pivoting upwardly as the piston 54 continues moving upwardly to its upper limit. Reversal of the control valve 57 will, of course, simultaneously return both pistons 54 and 55 downwardly to restore the transfer arm 39 to its initial position.

As previously mentioned, the pipe elevators 18 and 19 are respectively adapted to raise pipe sections onto the pipe supports 16 and to lower pipe sections off of the pipe supports 17. Although there may be instances where pipe sections to be inspected are already at a convenient elevation, the typical situation will require the use of the pipe elevators 18 and 19. For purposes of standardization, the pipe elevators 18 and 19 are preferably made identical and are either driven in opposite directions or alternately positioned with their opposite ends on the pipe supports 16 and 17.

Accordingly, as illustrated in FIGURES 2 and 3, each of the elevators 19, for example, is comprised of a pair of laterally-spaced supports or side plates 60 of sufficient length to enable the elevator to be positioned at a convenient inclination with its lower end on the ground and its upper end at the height of the pipe supports 17. Axles or shafts 61 and 62 are respectively journalled between the side plates 60 near the upper and lower ends thereof, with each of these shafts carrying a sprocket, as at 63 and 64, operatively engaged with a continuous roller chain 65. To drive the roller chain 65, driving means are provided such as an electric motor 66 that is mounted between the side plates 60 and, by means of a typical gear-reduction unit 67 and one or more progressively-reducing interconnecting sprocket-and-chain drives as at 68 and 69 for example, drives a sprocket 70 on the upper shaft 61 at a sufficiently low speed.

To safely support heavy pipes, as at 25, the underside of the roller chain 65 is slidably supported in an upturned longitudinal channel 71 secured between the side plates 60 and generally defining the path to be followed by the upper portion of the roller chain as it is driven. One or more uprights, as at 72, secured to the chain 65 have their leading edges as at 73 appropriately shaped to safely carry a pipe as at 25 when the elevator 19 is in its usual inclined position. To protect the chain 65 from pipes carried thereon, transversely-oriented blocks as at 74 are also secured at spaced intervals along the chain adjacent to the pipe-engaging uprights 72.

The elevators 19 are suitably arranged to have their upper ends respectively secured to the uprights 32 and 33. To support the lower ends of the elevators 19, a depending ground-engaging stand 75 is preferably pivotally mounted on the shaft 62 to accommodate differences in the inclination of the elevators. As previously mentioned, the elevators 18 are preferably identical to the elevators 19. Thus, as seen in FIGURE 1, with the elevators in position on opposite sides of the conveyor 15, the elevators 18 are driven so as to raise pipe sections as at 20 onto the pipe supports 16 and the elevators 19 are driven to lower pipe sections as at 25 from the pipe supports 17. The driving motors, as at 66, of each pair of the elevators 18 or 19 are, of course, operated in unison to keep a pipe section carried thereby in a generally horizontal position.

Turning now to FIGURES 4A–4E, schematic views are shown of the progressive steps of a single operational cycle of the pipe-handling apparatus 10 of the present invention. As seen in FIGURE 4A, a pipe section 100 is now lying on the conveyor 15 and two other pipe sections 101 and 102 are on the pipe supports 16 awaiting transfer to the conveyor. The pipe-transfer means 37 are in the initial position illustrated in FIGURE 2. It will be realized that the elevators 18 are operated as required to deliver pipe sections as at 103 onto the pipe supports 16 and the elevators 19 are similarly in readiness to remove pipe sections from the pipe supports.

Accordingly, as seen in FIGURE 4B, following the inspection and return of the pipe 100 to the conveyor 15, the piston actuators 52 and 53 (as well as the corresponding actuators of the pipe-transfer means 38) are simultaneously operated to begin the upward movement of the transfer arms 39 and 44. Once the transfer arms 39 and 44 have reached the depicted position (where the pivots 42 are at the top of the slots 43 and the pistons 55 have reached their upper limit of travel), the upper surfaces of the transfer arms will be immediately below the underside of the overhanging ends of the pipe section 100. It will also be noted that the free ends of the pivotal stops as at 46 have moved upwardly and are now interposed between the fixed stops 36 and the adjacent side of the conveyor 15. Thus, as shown in FIGURE 4C, upon continued upward travel of the pistons 54, the transfer arms 39 and 44 will be progressively tilted to provide an ever-increasing incline directed downwardly toward the pipe supports 17. Since the free outer ends of the transfer arms 39 and 44 are spaced well below the pipe 101 at the time that the intermediate portions of the arms first engage the pipe 100, the tilting of the transfer arms will assure that the pipe 100 will be lifted from the conveyor 15 and begin rolling onto the pipe supports 17 before the pipe 101 has been lifted sufficiently high to clear the upright stops 36. Thus, although considerable time is saved by simultaneously lifting the pipes 100 and 101, arresting members 46 of the present invention provide a positive safeguard against collison between the two pipes.

It should be noted at this point that the free ends of the transfer arms 39 and 44 are respectively arranged to project beyond the outer sides of the upright stops 36 a distance just slightly more than the diameter of one of the pipes 100–103. Thus, only the pipe 101 will be elevated and the vertical end surfaces of the transfer arms 39 will cooperate to prevent the pipe section 102 from rolling under the free ends of the transfer arms once they are fully elevated. To accommodate various diameters of pipe sections, the free ends of the transfer arms 39 and 44 are made adjustable in length as shown at 76 in FIGURE 2 and releasably secured in a selected position by a bolt or such as at 77.

Once the transfer arms 39 and 44 reach the position shown in FIGURE 4D, the pistons 54 will be at their maximum extended position. The pipe 100 will now have rolled across the supports 17 onto the elevators 19 and the pipe 101 will be properly positioned directly over the conveyor 15. Thus, as shown in FIGURE 4E, as the pistons 54 and 55 are retracted, the transfer arms 39 and 44 will be returned to their initial inactive positions to safely lower the pipe section 101 onto the conveyor 15. Once the free ends of the transfer arms 39 and 44 drops below the level of the pipe supports 16, the pipe section 102 will be released to roll on into engagement with the upright stops 36. Of particular interest, once the transfer arms 39 are well below the conveyor 15, the springs as at 48 will cooperate to return the pivoting arms 46 under the pipe 101 to their initial positions against their respective limits 50.

Accordingly, it will be appreciated that the present invention has provided new and improved apparatus for rapidly and safely transferring large pipe sections onto and off of a conveyor. More particularly, the unique movement of the pipe-transfer arms employed in the present invention provides a compact arrangement which would not be possible if they were pivoted about a fixed axis which, of necessity, would have to be laterally displaced at a considerable distance from the conveyor. Moreover, by virtue of the disclosed arrangement, the pipe-handling apparatus of the present invention is capable of easy erection on even irregular ground surfaces without requiring particular alignment between its various components. Thus, by employing the principles of the present invention, relatively lightweight and compact pipe-handling apparatus can be arranged for convenient transportation to a job location and quick erection without sacrificing the speed at which a large number of heavy and greatly elongated pipe sections can be safely handled.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:
1. Pipe-handling apparatus comprising: a conveyor adapted to support sections of pipe for translation along a generally-horizontal axis; first and second pipe racks arranged along opposite sides of said conveyor and respectively adapted for supporting pipe sections in first and second locations spaced laterally on opposite sides of and generally parallel to said horizontal axis; first and second pipe-transfer means longitudinally spaced in relation to said conveyor and operable in unison for transferring a pipe section from said conveyor onto said second pipe rack as another pipe section is transferred from said first pipe rack onto said conveyor, said first and second pipe-transfer means respectively including a member movable upwardly and downwardly in a vertical plane transverse to said horizontal axis and defining an extended upper surface spanning said first and second locations, first means operatively connected adjacent to one end of said movable member and providing a pivotal axis therefor movable over a limited span of travel between lower and upper limits below said second location, and second means operatively connected to said movable member between the other end thereof and said pivotal axis and selectively movable upwardly and downwardly for successively moving said movable member from a lower position to an intermediate position where said one end thereof has reached said upper limit of its said span of travel and then progressively pivoting said other end of said movable member further upwardly about its said pivotal axis to first bring said movable member to a slightly-inclined position where its said extended surface will lift a pipe section from said conveyor for rolling toward said second location and thereafter bring said movable member to a more-inclined elevated position where its said extended surface will lift a pipe section from said first location for rolling toward said conveyor; and first and second arresting means operatively carried on said first and second movable members respectively and responsive to rolling of a pipe section therealong from said first location for halting such a rolling pipe section in position to be subsequently lowered onto said conveyor upon return of said movable members downwardly from their said elevated positions toward their said lower positions.

2. The pipe-handling apparatus of claim 1 wherein said pipe racks respectively include inclined pipe-supporting members, with said inclined pipe-supporting members of said first pipe rack being inclined downwardly toward said conveyor and said inclined pipe-supporting members of said second pipe rack being inclined downwardly away from said conveyor; and further including: stop means fixed between said first pipe rack and said conveyor adapted for retaining pipe sections on said first pipe rack in said first location until said movable members move from their said slightly-inclined position toward their said more-inclined elevated position.

3. The pipe-handling apparatus of claim 2 further including: first and second pipe-engaging means on said other ends of said movable members, respectively, and adapted for preventing other pipe sections on said first pipe rack from rolling to said first location until said movable members are returning downwardly from their said slightly-inclined positions toward their said intermediate positions.

4. The pipe-handling apparatus of claim 1 wherein said first and second arresting means are respectively comprised of: an upright arm pivotally mounted on said first and second movable members respectively and having a free end projecting upwardly therefrom for pivotal movement transversely across said horizontal axis from a first position between said first location and said conveyor and a second position between said conveyor and said second location, biasing means normally urging said upright arm to said first position, and stop means adapted to halt said upright arm in said second position; said upright arms being of sufficient length for their said free ends to be engaged by a pipe section rolling along said movable members upon movement thereof toward their said elevated position and be shifted thereby to said second arm positions against said arm stop means to retain such a rolling pipe section generally above said conveyor so long as said movable members are in their two said inclined positions, the length of said upright arms being insufficient, however, to remain in engagement with such a pipe section once said movable members have returned to their said lower positions so that said arm-biasing means can return said upright arms below such a pipe section to their said first arm positions.

5. The pipe-handling apparatus of claim 4 wherein said pipe racks respectively include inclined pipe-supporting members with said inclined pipe-supporting members of said first pipe rack being inclined downwardly toward said conveyor and said inclined pipe-supporting members of said second pipe rack being inclined downwardly away from said conveyor; and further including: stop means fixed between said first pipe rack and said conveyor adapted for retaining pipe sections on said first pipe rack in said first location until said movable members move from their said slightly-inclined position toward their said more-inclined elevated position.

6. The pipe-handling apparatus of claim 5 further including: first and second pipe-engaging means on said other ends of said movable members, respectively, and adapted for preventing other pipe sections on said first pipe rack from rolling to said first location until said movable members are returning downwardly from their said slightly-inclined positions toward their said intermediate positions.

7. The pipe-handling apparatus of claim 6 further including: first pipe-elevating means adapted for lifting pipe sections onto said first pipe rack; and second pipe-elevating means adapted for lifting pipe sections off of said second pipe rack.

8. Pipe-handling apparatus comprising: a conveyor adapted to support sections of pipe and including rollers for axially moving such pipe sections in alternate horizontal directions; first and second supports at opposite ends of said conveyor and having first and second lateral pipe racks extending outwardly on opposite sides of said conveyor and respectively adapted for supporting generally-horizontal pipe sections in first and second locations spaced laterally on opposite sides of and generally parallel to said conveyor; first and second pipe-transfer means respectively mounted on said first and second supports and jointly operable in unison for successively transferring pipe sections from said conveyor onto said second pipe racks as pipe sections are transferred from said first pipe racks onto said conveyor, each of said pipe-transfer means including a movable member adapted for movement in a vertical plane transverse to said conveyor and defining an extended upper surface sufficient to just span said first and second locations, first piston means pivotally coupled to said movable member adjacent one end thereof for moving said one end vertically between lower and upper limits in a limited span of travel generally below said second location, and second piston means adapted for joint operation with said first piston means and operatively connected to said movable member adjacent to the other end thereof for moving said other end vertically over a greater span of travel in relation to said first location to successively move said other end of said movable member from a lower position to an intermediate position where said first piston means have carried said one end of said movable member to its said upper limit of vertical travel and then, once said first piston means have halted, progressively pivoting said other end of said movable member further upwardly to first bring said movable member to a first inclined position where said extended surface will raise a pipe section on said conveyor above said conveyor rollers for gravitational movement toward said second location on said second pipe racks and thereafter bring said movable member to a second further-inclined position where said extended surface will raise a pipe section in said first location for gravitational movement from said first pipe racks toward said conveyor; first and second arresting means including arms pivotally mounted on said movable members respectively and responsive to gravitational movement of a pipe section along said extended surfaces from said first location for halting such a pipe section in position to be subsequently laid onto said conveyor rollers upon return of said movable members downwardly toward their said lower positions; and control means interconnected to said first and second piston means and adapted for supplying a pressured fluid simultaneously thereto to operate said piston means in unison for selectively moving said movable members between their said elevated positions and their said lower positions.

9. The pipe-handling apparatus of claim 8 wherein said first and second pipe racks are inclined, with said first pipe racks being inclined downwardly toward said conveyor and said second pipe racks being inclined downwardly away from said conveyor; and further including first and second upright stops on said first and second supports between said first pipe racks and said conveyor, the upper ends of said upright stops being arranged in relation to said movable members for preventing pipe sections on said first pipe racks from rolling onto said conveyor until said movable members are about in their said second further-inclined positions.

10. The pipe-handling apparatus of claim 9 further including: means on said other ends of said movable members adapted for engaging the side of other pipe sections on said first pipe racks so long as said movable members are in their said inclined positions to prevent such other pipe sections from rolling to said first section until said movable members are being returned to their said lower positions.

11. As a sub-combination, portable pipe-handling apparatus comprising: a frame member adapted to be set in an erect position and having first and second laterally-spaced uprights, first and second transverse members respectively secured to said first and second uprights and extended toward one another to define elevated first and second pipe-supporting surfaces with a gap therebetween; an elongated member having an upper pipe-carrying surface and movably mounted transversely across said frame member between said uprights and adapted for vertical movement relative thereto between a lower position below said gap and an elevated position where its said pipe-carrying surface is above said pipe-supporting surfaces and spanning said gap; means pivotally coupling one end of said elongated member to said frame member below said second transverse member and vertically movable for limiting upward and downward movement of said one end to a span of travel below said second pipe-supporting surface; selectively-operable actuating means operatively arranged between said frame member and said elongated member and cooperable with said vertically-movable pivotally-coupling means for successively elevating said elongated member from its said lower position to an intermediate position where said one end thereof is at the upper limit of its said span of travel and thereafter pivoting the other end of said elongated member further upwardly in relation to its said one end to bring said elongated member to its said elevated position where its said pipe-carrying surface defines a downward incline above said first pipe-supporting surface spanning said gap and directed toward said second pipe-supporting surface; and pipe-arresting means on an intermediate portion of said elongated member including an upright stop operatively mounted thereon for movement relative to said pipe-carrying surface, movement-limiting means on said elongated member for restricting said movable stop to movement between a first limit generally adjacent to said first transverse member and a second limit generally adjacent said second transverse member, and means normally urging said movable stop toward its said first limit, said movable stop being adapted for engagement by a pipe rolling downwardly across said pipe-carrying surface when inclined and movable thereby to said second limit to halt such a rolling pipe generally over said gap so that, upon subsequent return of said elongated member toward its said lower position, that pipe will be lowered into said gap.

12. The pipe-handling apparatus of claim 11 wherein said elevated pipe-supporting surfaces are inclined, with said first pipe-supporting surface being inclined downwardly toward said gap and said second pipe-supporting surface being inclined downwardly away from said gap; and further including a fixed upright between said gap and said first pipe-supporting surface and projecting no higher than about the maximum height reached by the contiguous portion of said pipe-carrying surface when said elongated member is in its said elevated position.

13. The pipe-handling apparatus of claim 12 wherein said vertically-movable pivotally-coupling means include second selectively-operable actuating means operatively arranged between said frame member and having an actuator pivotally coupled to said one end of said elongated member adapted for vertically moving said one thereof in its said span of travel; and said first-mentioned actuating means include an actuator pivotally coupled adjacent to said other end of said elongated member and having a greater span of travel than said second actuator for successively elevating and pivoting said other end thereof; and further including control means selectively operable for moving said actuators in unison.

14. The pipe-handling apparatus of claim 13 wherein said first and second actuating means are pressure-responsive actuating devices having selectively-reciprocating piston members for their respective said actuators; and said control means include a selectively-operable valve for admitting and exhausting a pressure fluid to and from said actuating devices in unison.

References Cited

UNITED STATES PATENTS 1,890,413    12/1932    Rosebush    214—41
2,043,556    6/1936    Protin.

ROBERT G. SHERIDAN, Primary Examiner

FRANK E. WERNER, Assistant Examiner